US005793136A

United States Patent [19]
Redzic

[11] Patent Number: 5,793,136
[45] Date of Patent: Aug. 11, 1998

[54] DIFFERENTIAL MOTOR/GENERATOR APPARATUS

[76] Inventor: Sabid Redzic, 511 W. Palatine Rd., Arlington Heights, Ill. 60004

[21] Appl. No.: 655,253

[22] Filed: Jun. 5, 1996

[51] Int. Cl.[6] ................................................. H02K 16/00
[52] U.S. Cl. ..................... 310/114; 310/112; 310/266; 310/164; 310/156; 310/216; 310/269
[58] Field of Search ..................... 310/114, 112, 310/266, 156, 269, 216, 164

[56] References Cited

U.S. PATENT DOCUMENTS

| 396,355 | 1/1889 | Dyer | 310/114 |
|---|---|---|---|
| 1,641,548 | 9/1927 | Oswald | 310/216 |
| 2,722,617 | 11/1955 | Cluwen et al. | 310/156 |
| 4,103,197 | 7/1978 | Ikegami et al. | 310/267 |
| 4,255,684 | 3/1981 | Mischler et al. | 310/216 |
| 4,373,147 | 2/1983 | Carlson, Jr. | 318/48 |
| 4,375,047 | 2/1983 | Nelson et al. | 318/48 |
| 4,532,447 | 7/1985 | Cibie | 310/114 |
| 4,755,700 | 7/1988 | Yongning et al. | 310/114 |
| 4,867,652 | 9/1989 | Gormley | 417/353 |
| 5,420,471 | 5/1995 | Yun | 310/216 |

FOREIGN PATENT DOCUMENTS

| 61-35145 | 2/1986 | Japan | 310/164 |
|---|---|---|---|
| 5227711 | 9/1993 | Japan | 310/114 |

*Primary Examiner*—Steven L. Stephan
*Assistant Examiner*—Karl Eizo Tamai
*Attorney, Agent, or Firm*—Factor and Shaftal, LLC

[57] ABSTRACT

A differential motor/generator apparatus comprising a stator region, a first rotating member and a second rotating member. The stator region includes at least one stator component and an opening. The stator member includes at least one pair of torroid regions each having at least one winding positioned thereon in parallel. The first rotating member is associated with the stator region and is positionable within the opening of the stator region. The second rotor member is rotatably associated with the stator region and includes a cavity. A portion of the stator region and the first rotor member are positionable within the cavity of the second rotating member. This enables the first and the second rotating members to rotate about a common axis of rotation.

13 Claims, 5 Drawing Sheets

DIFFERENTIAL MOTOR/GENERATOR APPARATUS

BACKGROUND OF THE INVENTION

1. Field of the Invention

The present invention is directed to an electric motor, and more specifically, to a motor apparatus having two concentrically rotating shafts and a single stator region.

2. Background Art

Electric motors (and generators) have been known in the art for many years. Electric motors range in size and output and operation. Electric motors, use electric current or voltage as an input and then output rotation to a shaft member. Conversely, electric generators/alternators, receive the rotation of a shaft as input and output an electric current or voltage. Relative to size, electric motors (generators) range from those used in precise medical equipment and in some electronic componentry to motors (generators) which power electric automobiles, hybrid electric/diesel locomotives, and which generate electricity in hydroelectric plants.

Certain electric motors have been developed that utilize multiple rotors and multiple stators.

It has become desirable to control two shafts associated with a single stator, such that the rotors, and, in turn, the loads on the rotors, influence each other.

It is further an object of the present invention to provide a single stator in combination with two rotors.

It is also an object of the present invention to provide a particularly configured stator member to maximize the desired properties of a multiple rotor, single stator electric motor/generator.

These and other objectives will become clear in light of the specification and claims.

SUMMARY OF THE INVENTION

The present application is directed to a differential motor/generator apparatus having a stator region, a first rotor member and a second rotor member. The stator region includes at least one stator component and an opening. The stator component includes at least one pair of torroid regions. Each torroid region includes at least one winding positioned thereon and joined in parallel, at least one inner wing member and at least one outer wing member.

The first rotor member is rotatably associated with the stator region. At least a portion of the first rotor member is positionable within the opening of the stator region. The second rotor member is rotatably associated with the stator region. The second rotor member includes a cavity. At least a portion of the stator region and the first rotor member are positionable within the cavity. This, in turn, enables the first rotor member to rotate relative to the second rotor member, about a common axis.

In a preferred embodiment, the stator member may further include at least stator components positioned colinearly, and a stator separator member positioned between each of the three stator components.

In another preferred embodiment, the second rotor member comprises a permanent magnet. In yet another preferred embodiment, the first rotor member comprises a permanent magnet, and the second rotor member comprises a permanent magnet.

In another preferred embodiment, the first rotor, and/or the second rotor may comprise an electro-magnet.

Preferably, the pair of torroid regions and the at least one inner and the at least one outer wing members are substantially concentric about the axis of rotation.

In a preferred embodiment, a housing member is associated with the stator region. The housing member encases at least a portion of the second rotor member.

Preferably, the at least one pair of torroid regions comprises one pair of torroid regions.

BRIEF DESCRIPTION OF THE DRAWINGS

FIG. 6 of the drawings is a cross-sectional view of a third embodiment of the differential motor apparatus.

DETAILED DESCRIPTION OF THE DRAWINGS

Figure 1:
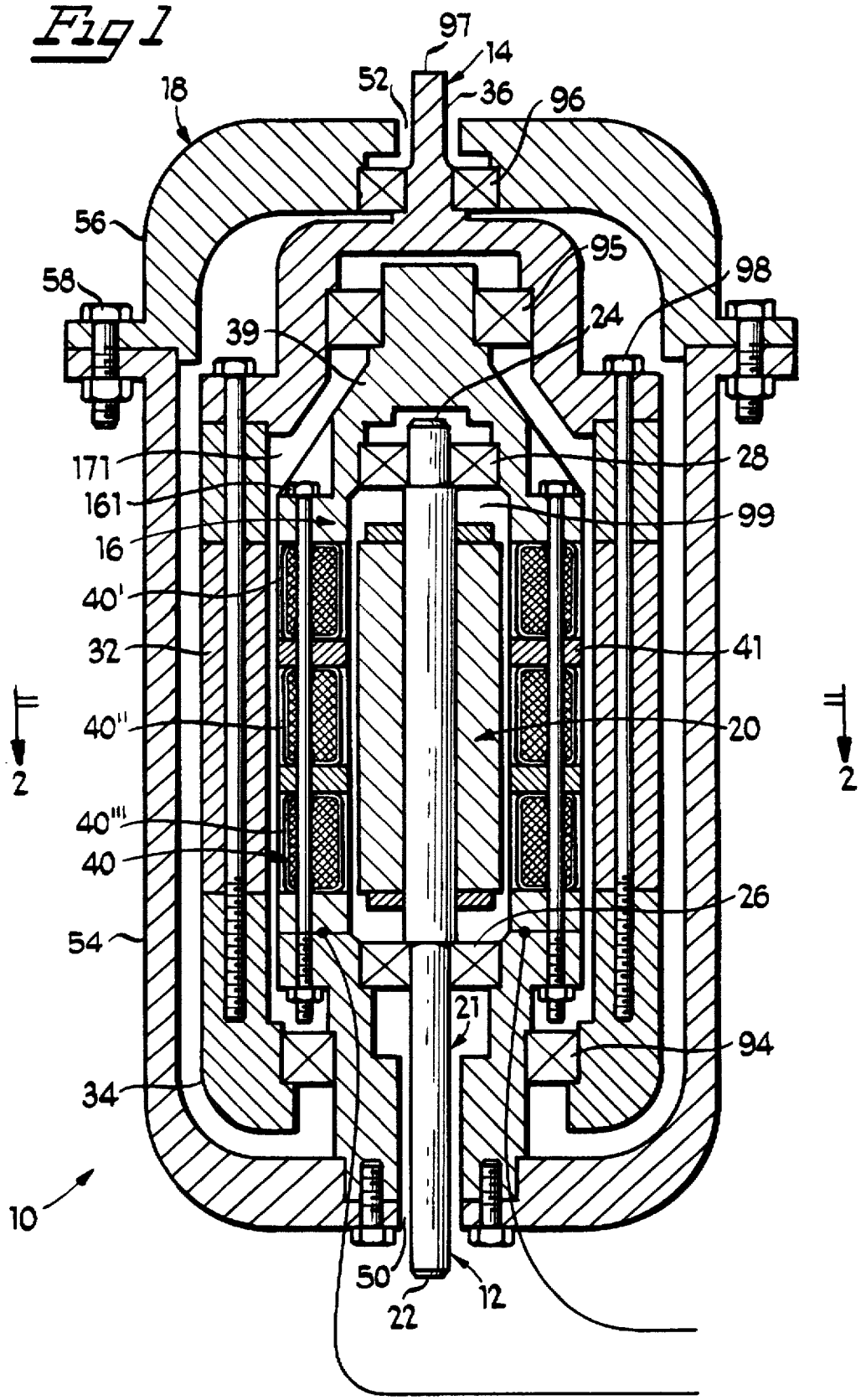
FIG. 1 of the drawings is a cross-sectional view of a first embodiment of the differential motor apparatus.

While this invention is susceptible of embodiment in many different forms, there is shown in the drawings and will herein be described in detail, specific embodiments with the understanding that the present disclosure can be considered as an exemplification of the principles of the invention and is not intended to limit the invention to the embodiments illustrated.

Figure 2:
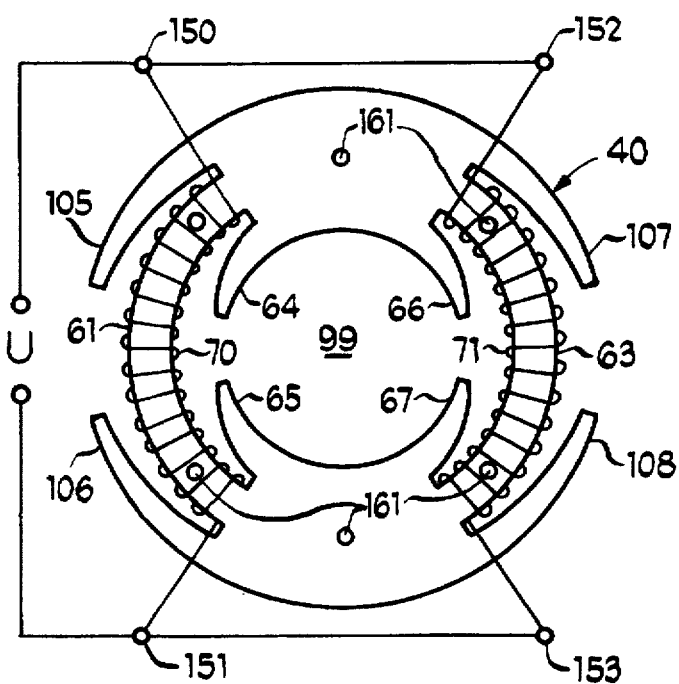
FIG. 2 of the drawings is a front planar view of the stator of the first embodiment showing in particular, the configuration thereof and the windings thereon.
Figure 3:
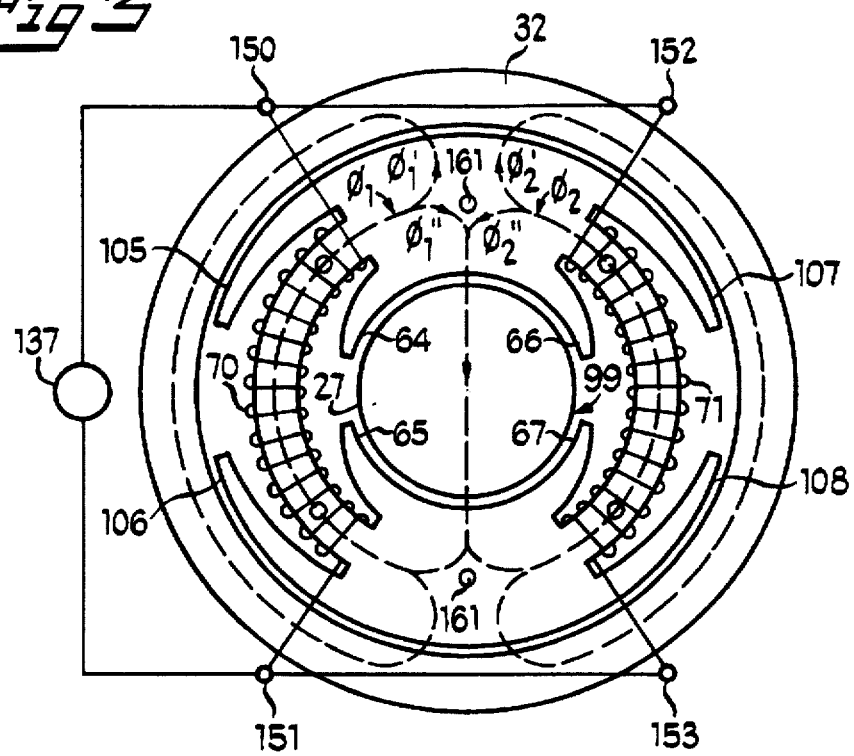
FIG. 3 of the drawings is a schematic view of the stator of the first embodiment showing the magnetic flux directed therethrough in operation.

A first embodiment of the differential motor/generator apparatus 10 is seen in FIGS. 1–3 as comprising first rotating member 12, second rotating member 14, stator region 16 and housing member 18. Housing member 18 includes first opening 50 and second opening 52 opposite first opening 50. This first embodiment is illustrative of an embodiment which either is powered by or generates three-phase AC current.

Housing member 18 may include first subassembly 54 and second subassembly 56, which are joined with housing fasteners, such as fastener 58. Such a configuration of housing member 18 allows for ease of access into the components which are contained within housing member 18. Other housings having various configurations and various components have also been contemplated, as have various construction materials, including metals, plastics and composites. Further, it has also been contemplated that housing member 18 may include fins, openings, forced air traveling therethrough and/or other structures to foster the cooling thereof.

Stator region 16 is shown in FIG. 1 as including stator carrier 39, stator member 40, having three stator components 40', 40", 40'", and stator separator member 41. The three stator components 40', 40", 40'" are positioned concentrically and are rotatably offset 120° from each other. Stator region 16 is attached to first subassembly 54 of housing member 18, via fasteners, such as fastener 98. Stator member 40 and stator separator member 41 are attached to stator carrier 39 via extended stator fasteners, such as extended stator fastener 161. As such, the stator member 40 and stator separator member 41 are fixedly maintained from rotation relative to housing member 18. Stator separator member 41 preferably comprises a non-ferromagnetic material such as aluminum or brass, while other metals and alloys have also been contemplated.

Stator component 40' is shown in FIG. 2 as including two torroid regions 61, 63, four inner wing members 64, 65, 66, 67, four outer wing members 104, 105, 106, 107 and opening 99 therethrough. It will be understood that each stator component 40', 40", 40'" are substantially identical in structure.

Outer wing members 105, 106 are substantially concentric with torroid region 61 and extend proximate at least a portion of torroid region 61. Outer wing members 105, 106 do not contact each other; the distance between the ends of the wing members is dictated by the desired output/input characteristics of the motor. Similarly, outer wing members 107, 108 are substantially concentric with torroid region 63 and extend along at least a portion of torroid region 63. Like wing members 105, 106, outer wing members 107, 108 do not contact each other.

As shown in FIG. 2, inner wing members 64, 65 are also substantially concentric with torroid region 61 and extend along at least a portion of torroid region 61 opposite outer wing members 105, 106. Likewise, inner wing members 66, 67 are substantially concentric with torroid region 63 and extend along at least a portion of torroid region 63 opposite outer wing members 107, 108. The inner wing members, like the outer wing members, do not contact each other.

The configuration of the inner and outer wing members captures and improves the magnetic field density that is created about torroid regions 61, 63. The stator components preferably comprise a ferromagnetic material such as laminated ferromagnetic sheeting, while other materials have also been contemplated. This may have a lacquer coating in the European Super Class configuration, as it is known by those of skill in the art.

As shown in FIG. 2, each of torroid regions 61, 63 include windings 70, 71, respectively. Winding 70, which includes first end 150 and second end 151, is wrapped around torroid region 61 a predetermined number of revolutions. Similarly, winding 71, which includes first end 152 and second end 153, is wrapped around torroid region 63 the same predetermined number of revolutions. As shown in FIG. 2, first end 150 of winding 70 is attached to first end 152 of winding 71, and, second end 15, of winding 70 is attached to second end 153 of winding 71—that is, the windings are in parallel. Windings 70, 71 are preferably constructed of copper wire having a certain thickness, while other electrically conductive wiring materials such as, for example, aluminum, have also been contemplated. Further, to meet European Super Class specifications, windings 70, 71 may be lacquer coated (for cooling considerations). Other configurations for the stator components have also been contemplated, namely, the torroid regions may be substantially square in configuration, for example, or hexagonal.

It will be understood to one of ordinary skill in the art that the number of times winding 70 and winding 71 extend around the respective torroid regions 61, 63 will depend on the desired input and output characteristics of the apparatus, and, in turn, on the desired application for which that apparatus is intended, so long as the number of windings is the same for both windings 70, 71. It will be further be understood that the stator member may include more torroid regions, such as, for example, four, six, eight or more regions. Each of these torroid regions include inner wing members and outer wing members that are substantially identical in configuration to the two torroid configuration.

First rotating member 12 is shown in FIG. 1 as including first rotor member 20, first shaft member 21, first bearing member 26 and second bearing member 28. First shaft member 21 includes first end 22 and second end 24. First rotor member 20 is fixedly associated with first shaft member 21 between first end 22 and second end 24. First end 22 of first shaft member 21 extends through first opening 50 of housing member 18. At least a portion of first rotating member 20 is positioned within opening 99 of one stator member 40. In a three phase AC motor operation, first rotor member 20 comprises a conventional short circuit rotor of an asynchronous electro-motor, while in a three phase AC generator/motor operation, wherein the first rotor is a generator, first rotor member 20 comprises a permanent magnet.

First bearing member 26 and second bearing member 28 are positioned between stator region 16 and shaft member 21, to facilitate rotation of first rotating member 20 within stator region 16 and, in turn, housing member 18. While first and second bearing members 26, 28 comprise ball bearings, it will be understood that journal bearings, roller bearings or other bearing members are also contemplated, including polymeric and composite coatings and other coatings.

Second rotating member 14 is shown in FIG. 1 as including second rotor member 32, having proximal end 34 and distal end 36, and cavity 171. Second rotor member 32 is positioned to rotate concentric with first rotor member 20 between housing 18 and stator region 16. Specifically, at least a portion of stator region 16 as well as first rotating member 12 are positioned within cavity 171 of second rotor member 32. Distal end 36 of second rotor member 32 includes second shaft member 97 which is collinear with the axis of rotation of first shaft member 21. At least a portion of distal end 36 of second rotor member 32 extends through second opening 52 of housing 18. In a three phase AC motor configuration, second rotor member 32 comprises a conventional outer short circuit rotor of an asychronous motor, while in a three phase AC generator/motor configuration where the second rotor member is the generator, the second rotor member is a permanent magnet.

Like first rotating member 12, second rotating member 14 includes a proximal bearing 94 and two distal bearings 95, 96. Proximal bearing 94 is positioned near proximal end 34 of second rotating member 14, providing a bearing surface between second rotating member and stator region 16. Distal bearing 95 is positioned near distal end 36 of second rotating member, providing a bearing surface between second rotating member and stator region 16. Distal bearing 96 is likewise positioned near distal end 36 of second rotating member, providing a bearing surface between second rotating member, specifically second shaft member 97, and housing member 18.

It will be understood to one of ordinary skill in the art that the second shaft member 97 and first shaft member 21 may exit on the same side of the housing member. This could be accomplished, for instance, by having second shaft member include an inner opening with the first shaft member exiting from this inner opening of shaft member 97. A bearing member may be disposed therebetween to facilitate relative rotation of the second shaft member and the first shaft member. The operation of a same side shaft design is essentially no different than one that has a shaft existing either side of the housing member.

Figure 4:
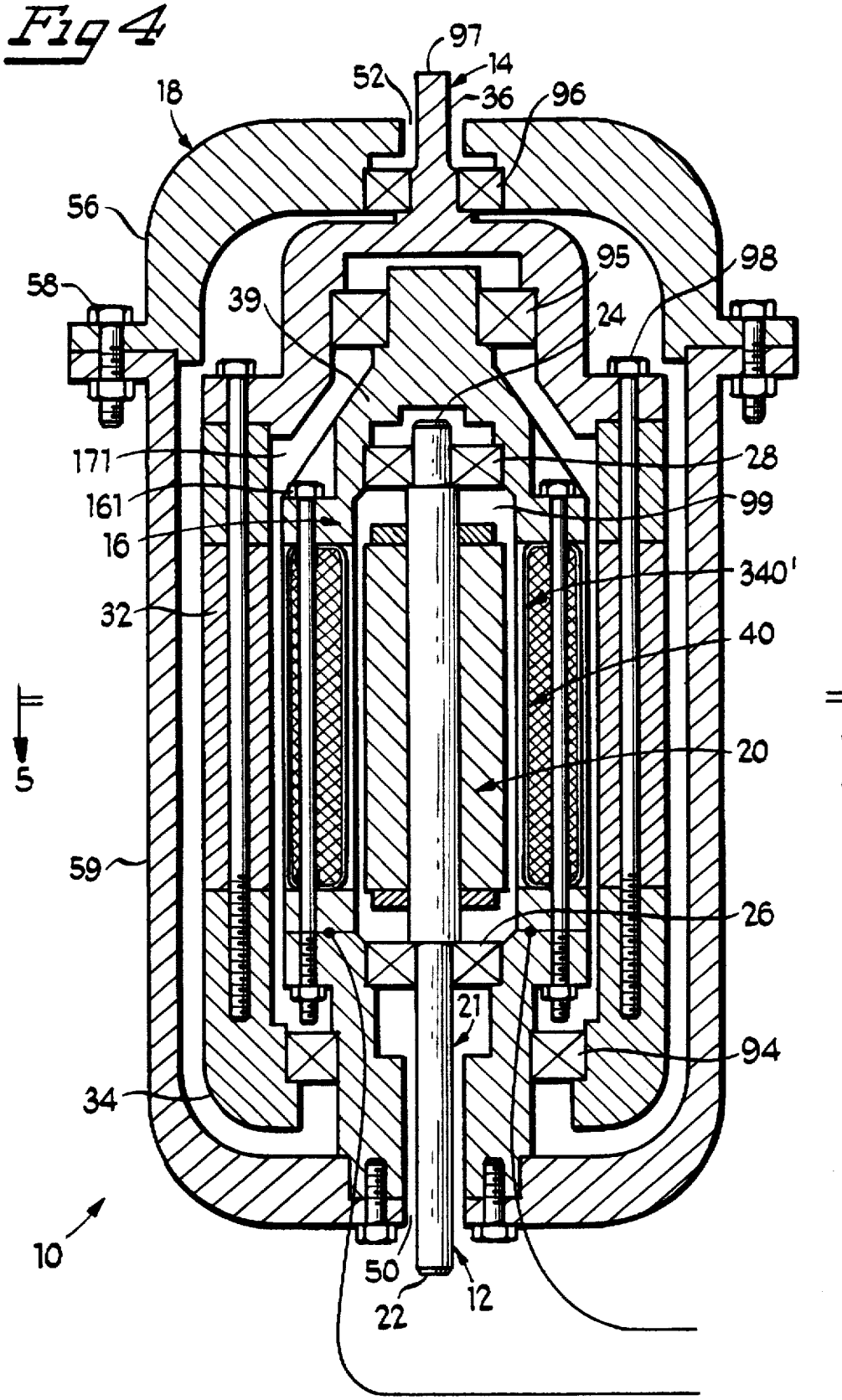
FIG. 4 of the drawings is a cross-sectional view of a second embodiment of the differential motor apparatus.
Figure 5:
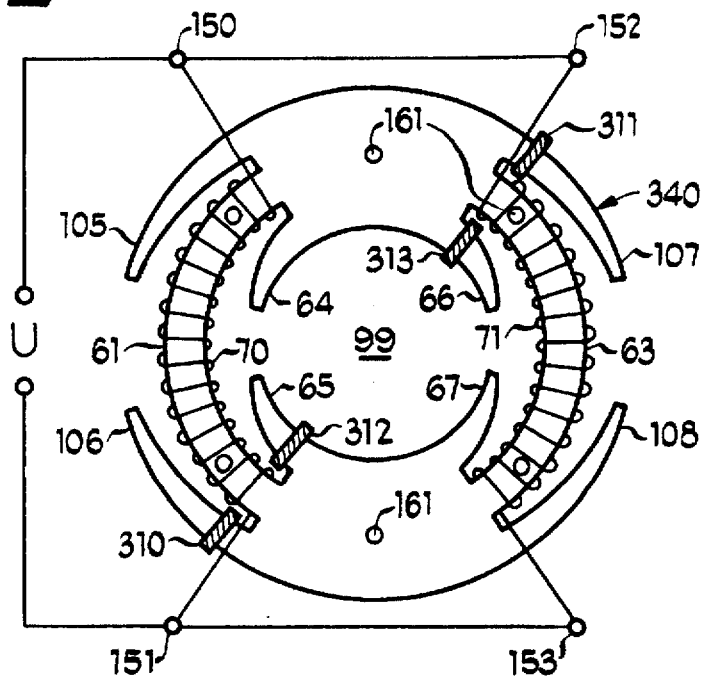
FIG. 5 of the drawings is a front planar view of the stator of the second embodiment showing in particular, the configuration thereof and the windings thereon.

A second embodiment of the present invention, a monophase AC configuration, can be seen in FIGS. 4 and 5. While a majority of the structure will not change relative to the first embodiment, the second embodiment includes certain differences with the stator region. As such, elements similar to these described relative to the first embodiment are provided with like reference numerals.

Specifically, in this embodiment, one stator component 340' is in stator member 40. As seen in FIG. 5, short circuit brass rings 310, 311, 312, 313 are positioned at the base of outer wings 106, 105 and inner wings 65, 66, respectively. These affect the moments and the torques, and are required when AC current is run in a monophase configuration to stator region 16—essentially, they assist in the initiation movement of the rotors.

Figure 7:
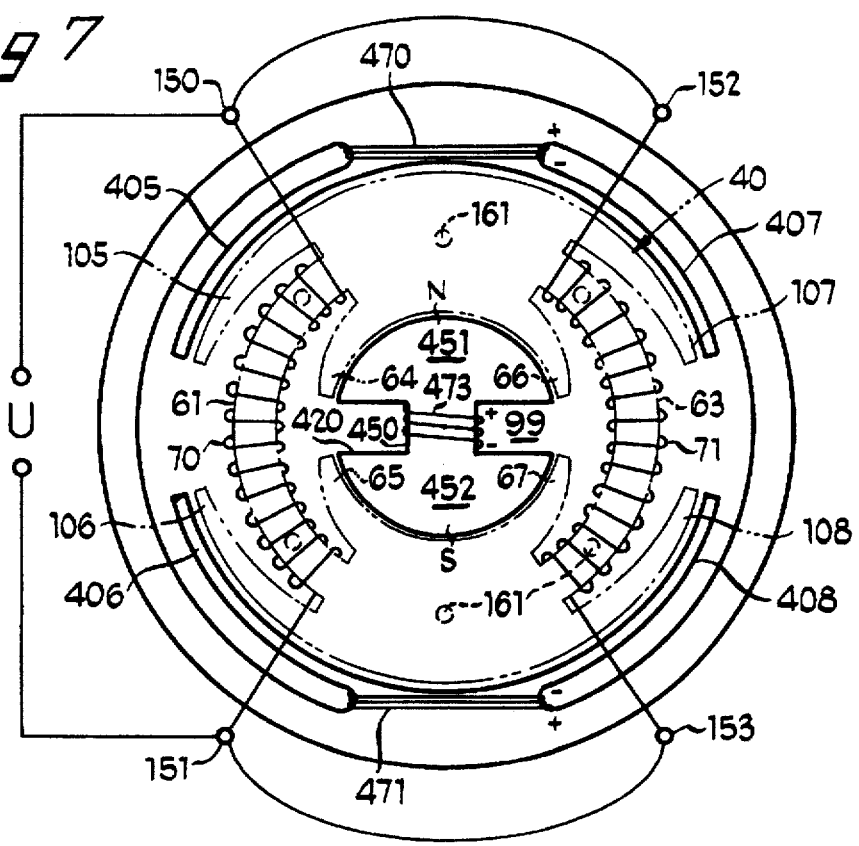
FIG. 7 of the drawings is a front planar view of the stator of the third embodiment of the differential motor apparatus showing in particular, the configuration thereof and the windings thereon.
Figure 8:
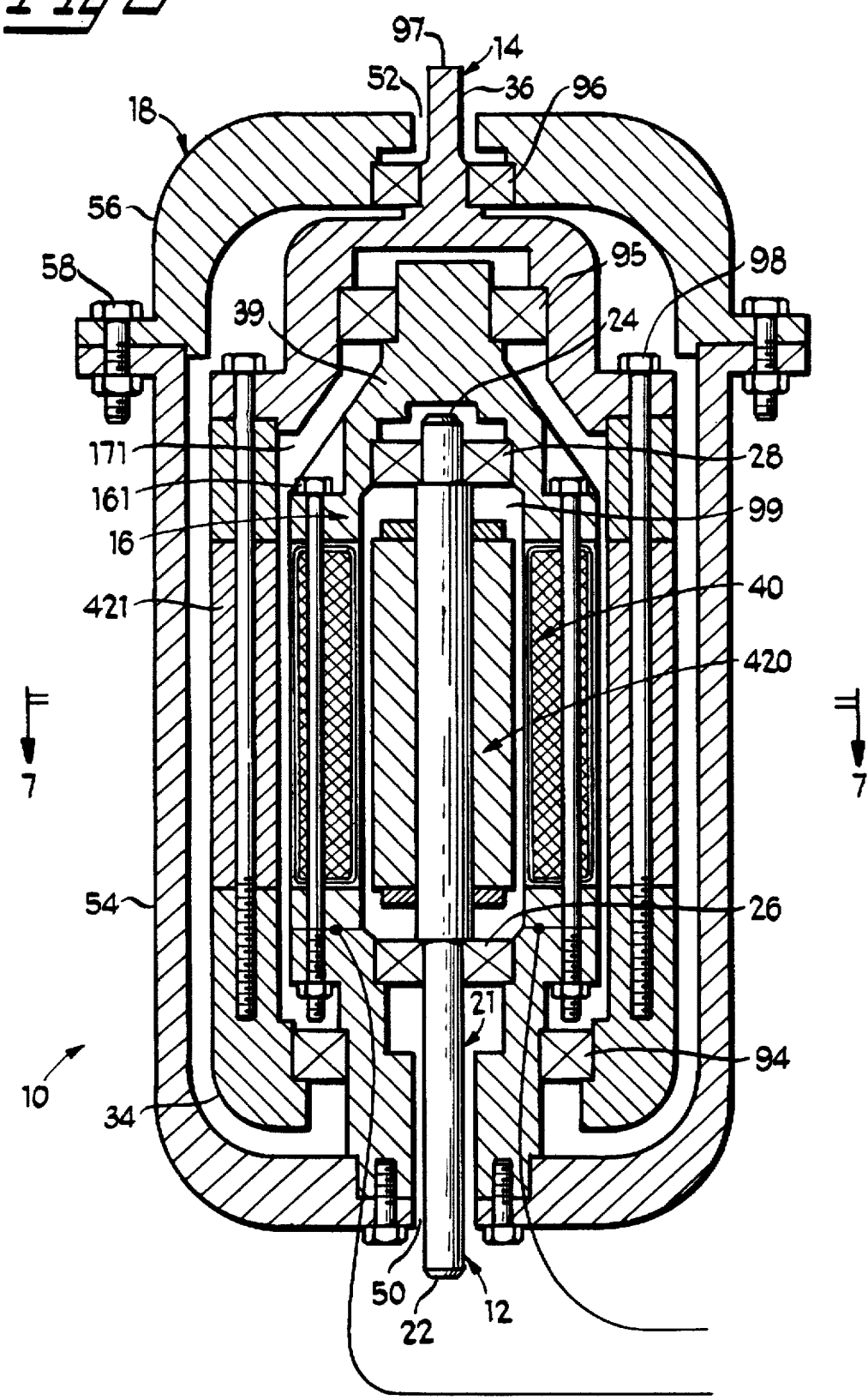

In a third embodiment the apparatus comprises a DC configuration motor/generator. Again, elements similar to those described relative to the first embodiment are provided with like reference numerals. As can be seen in FIGS. 6 and 7, only one stator component is required and the configuration of that stator component is like that of stator component 40' (FIG. 2).

First rotor member 420 is shown in FIG. 7 as comprises a rectangular member 450 having substantially identical semicircles 451, 452 integrated therewith. The semicircles extend to substantially follow the configuration of internal wing members 64, 65, 66, 67. First rotor member comprises a magnet having its north pole about semicircle 451 and south pole about 452. First rotor member comprises an electro-magnet, wherein windings 473 run about rectangular region 450. First rotor member may comprise a permanent magnet, wherein the rotor configuration is identical to the first rotor member 420, without windings 473.

Second rotor member 421 includes wing members 405, 406, 407, 408, which match outer wind members 105, 106, 107, 108, respectively. Second rotor member is likewise an electro-magnetic rotor and windings 470, 471 are positioned about the base of wing members 405, 407 and also about the base of wing members 106, 108. Of course, second rotor member 421 may comprise a permanent magnet.

Further, it will be understood first and second rotor members will include brushes (not shown), of the type conventionally used with DC elector-motors if the rotors are electro-magnetic.

It will be understood that the operation of the invention is illustrated with one pair of windings and one of the stator components in a three phase AC configuration, however, regardless of the power source, the magnetic flux created within a stator component will be basically substantially similar.

Accordingly, in operation, power supply 137 is applied to windings 70, 71 (FIG. 3), specifically ends 150, 151, 152 and 153. A current applied to these windings creates a magnetic flux, shown in FIG. 3 as $\phi_1$ and $\phi_2$ respectively. These magnetic fields are substantially identical in magnitude. The magnetic flux created by the current through winding 70 splits into two components. Likewise, the magnetic flux created by current through winding 71 splits into two components. Magnetic flux $\phi_1'$ and $\phi_2'$ extend through opening 99 orthogonal to first shaft member 27. Magnetic flux $\phi_1''$ and $\phi_2''$ extend in opposite directions through second rotating member 32. As the magnetic flux impose forces onto the first rotor and the second rotor, these rotors begin to rotate relative to the stator.

Based on load of the rotors, and, in turn, the shafts and the power supplied, these fluxes can change relative to each other (so long as, $\phi_1$ and $\phi_2$ are constant for a constant power supply). For instance, if load increases on the first rotor, the magnetic flux will be directed toward the second rotor, and the second rotor will increase in speed. Likewise, as the load decreases on the first rotor, the magnetic flux will be directed toward the first rotor, and the second rotor will decrease in speed. The rotors will work an equilibrium state. In sum, the relative load on one rotating member affects the flux therethrough, and, in turn affects the flux on the other rotor—the rotors affect each other and one rotor is in constant reaction to changes incurred by or on the other rotor.

In a D.C. configuration (third embodiment) shafts 22, 97 of rotating members 12, 14, respectively can each be attached to, for example, opposite wheels of a vehicle, such as an automobile. Such an arrangement facilitates for turns that the vehicle may make, analogous to a mechanical differential. One only needs to control the amount of power that is transmitted to the apparatus, and the apparatus automatically adjusts the relative rotor speeds both when the vehicle is going straight as well as when the vehicle is turning. Specifically, as the vehicle turns, the outer wheel travels a greater distance than the inner wheel. Due to the relationship between rotors, the two rotating members and fluxes therethrough will adjust internally and automatically for the greater distance that is travelled by one wheel.

Specifically, if the outer wheel is connected to the first rotor, the greater distance travelled will increase the speed of the first rotor. This increase in speed (analogous to a drop in load) appears direct the magnetic flux toward this first rotor. This appears to lessen the flux through the second rotor, and, in turn, the second rotor decreases in relative speed. When the car straightens out, the relative loads will again change, and the motor appears to again internally compensate for same. Thus, there is no need for a gear train or a gear differential or independent motors at each wheel which incur greater losses and, thus, this system is more efficient.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. A differential motor apparatus comprising:

a stator region having at least one stator component and defining an opening therethrough wherein the opening includes a central axis, the stator component includes at least one pair of torroid regions each torroid region being disposed symmetrically about the stator in an arcuate configuration substantially coaxial about the central axis, each torroid region including a first end and a second end, and at least one winding extending along the torroid region, the at least one winding on each of the pair of torroid regions being joined in parallel to each other;

at least one inner wing member extending in an arcuate configuration substantially coaxial with the central axis from an inner side of at least one of the first end and the second end of each torroid region;

at least one outer wing member extending in an arcuate configuration substantially coaxial with the central axis from an outer side of at least one of the first end and the second end of each torroid region;

a first rotor member, at least a portion of the first rotor member extending through the opening of the at least one stator component, the first rotor member being coaxially rotatable about the central axis of the opening relative to the stator region;

a second rotor member having a cavity, at least a portion of the at least one stator component and at least a portion of the first rotor member being positioned within the cavity of the second rotor member, the second rotor member being independently coaxially rotatable about the central axis of the opening relative to the first rotor and the stator region.

2. The apparatus according to claim 1 wherein the at least one stator member comprises at least three stator components positioned colinearly, and a stator separator member positioned between each of the three stator components.

3. The apparatus according to claim 2 wherein the second rotor member comprises a permanent magnet.

4. The apparatus according to claim 1 wherein the first rotor member comprises a permanent magnet, and the second rotor member comprises a permanent magnet.

5. The apparatus according to claim 1 wherein the first rotor comprises an electro-magnet.

6. The apparatus according to claim 1 wherein the second rotor comprises an electro-magnet.

7. The apparatus according to claim 1 wherein one of the at least one inner wing members of each stator component and one of the at least one outer wing members of each stator component each includes a ring member positioned thereabout.

8. The apparatus according to claim 1 further including a housing member associated with the stator region, the housing member encasing at least a portion of the second rotor member.

9. The apparatus according to claim 1 wherein the at least one pair of torroid regions comprises one pair of torroid regions.

10. The apparatus according to claim 1 wherein the at least one inner wing member comprises two pairs of substantially identically shaped inner wing members, the first of the pair of inner wing members extending from the inner side of each of the first ends of each torroid region, the second of the pair of inner wing members extending from the inner side of each of the second ends of each torroid region, the pair of inner wing members symmetrical about a single axis which bisects both torroid regions.

11. The apparatus according to claim 1 wherein the at least one outer wing member comprises two pairs of substantially identically shaped outer wing members extending from the outer side of each of the first ends of each torroid region, the second of the pair of outer wing members extending from the outer side of each of the second ends of each torroid region, the pair of outer wing members symmetric about a single axis which bisects both torroid regions.

12. The apparatus according to claim 11 the at least one inner wing member comprises two pairs of substantially identically shaped inner wing members, the first of the pair of inner wing members extending from the inner side of each of the first ends of each torroid region, the second of the pair of inner wing members extending from the inner side of each of the second ends of each torroid region, the pair of inner wing members symmetrical about a single axis which bisects both torroid regions.

13. The apparatus according to claim 1 wherein the stator region, the first rotor and the second rotor are substantially of the same length.

* * * * *